United States Patent [19]

Lundblom

[11] Patent Number: 4,830,074

[45] Date of Patent: May 16, 1989

[54] ROUTER STAND WITH GUARD ASSEMBLY

[76] Inventor: Richard J. Lundblom, 1661 Ashton Dr., Virginia Beach, Va. 23464

[21] Appl. No.: 219,432

[22] Filed: Jul. 15, 1988

[51] Int. Cl.$^4$ .............................................. B27G 19/00
[52] U.S. Cl. .............................. 144/251 B; 83/440.2;
144/253 R; 144/253 F; 144/87; 144/286 R;
409/134; 409/145
[58] Field of Search ................. 144/87, 251 R, 251 B,
144/253 R, 253 F, 253 J, 286 R; 83/440.2;
409/134, 145, 218, 227, 228

[56] References Cited

U.S. PATENT DOCUMENTS

| | | | |
|---|---|---|---|
| 1,758,834 | 5/1930 | Heston et al. | 144/253 F |
| 2,612,914 | 10/1952 | Reynolds | 144/253 F |
| 2,911,021 | 11/1959 | Engel | 144/251 B |
| 3,111,148 | 11/1963 | Herrmann et al. | |
| 4,163,465 | 8/1979 | Strong | |
| 4,509,572 | 4/1985 | L'Archer | |
| 4,538,654 | 9/1985 | Nickoloff | |
| 4,561,478 | 12/1985 | Fields | |
| 4,655,268 | 4/1987 | Lundblom | |
| 4,693,288 | 9/1987 | Buechele et al. | |

FOREIGN PATENT DOCUMENTS 387909  5/1908  France .............................. 144/253 F Primary Examiner—W. Donald Bray
Attorney, Agent, or Firm—Dennison, Meserole, Pollack & Scheiner

[57] ABSTRACT

A tool stand including a vertical support panel with a horizontal work-supporting table mounted for vertical adjustment thereon. The support panel horizontally mounts a power router with the router bit overlying the table. An elongate retainer rail mounts on the table outward of the bit, and a finger guard mounts on the rail and extends inwardly therefrom in overlying relation to the bit. The retainer rail is adjustable on the table for varying the width of the work area between the rail and the support panel. The guard is spring-biased to an extended position overlying the bit for selective retraction thereof as may be required upon the introduction of a workpiece.

20 Claims, 3 Drawing Sheets

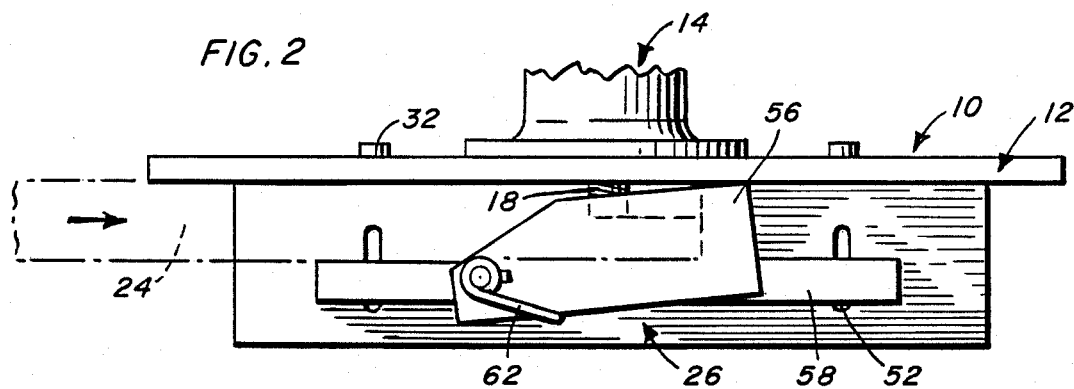
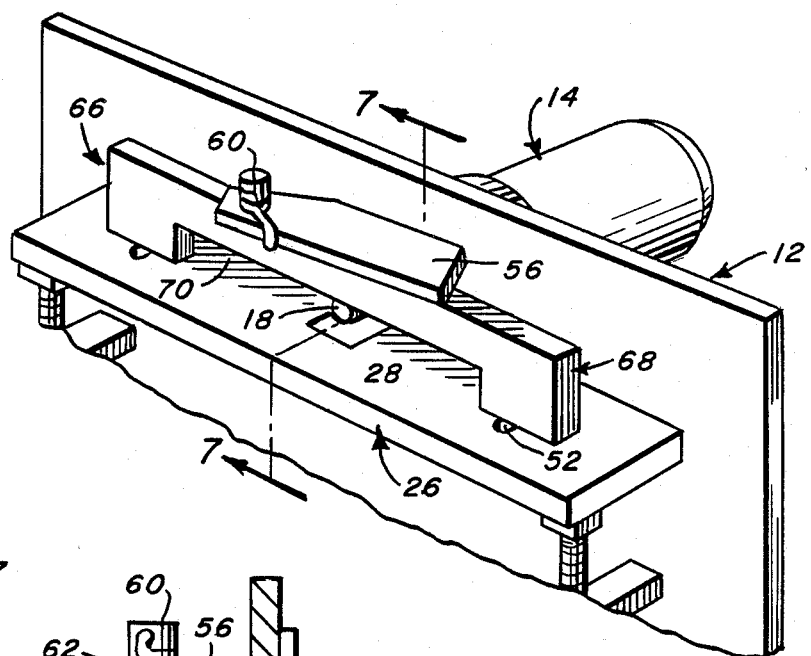
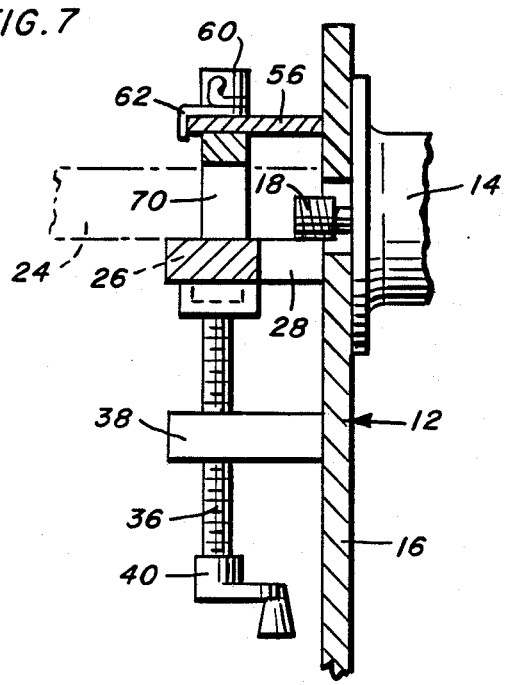

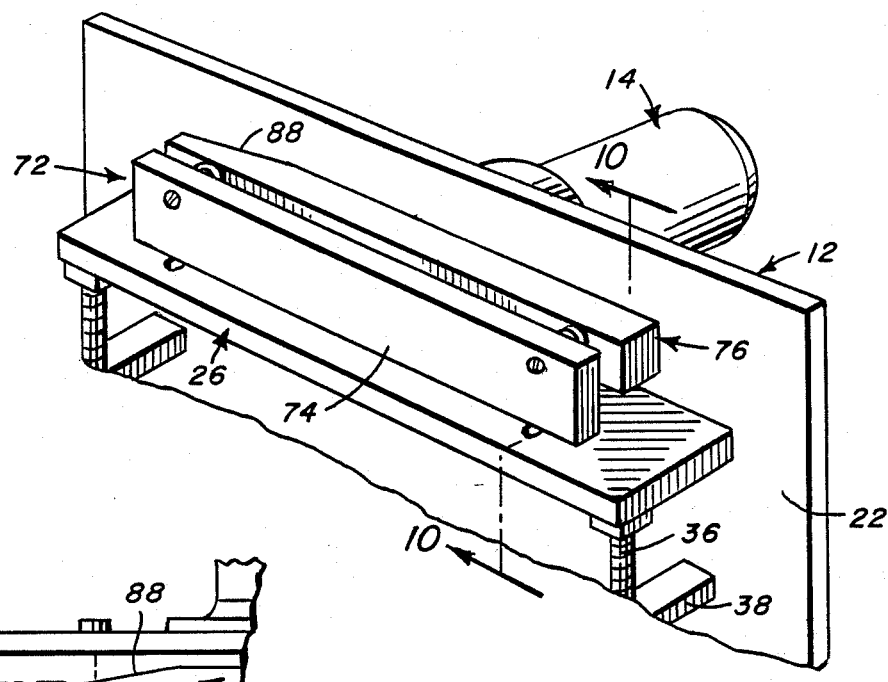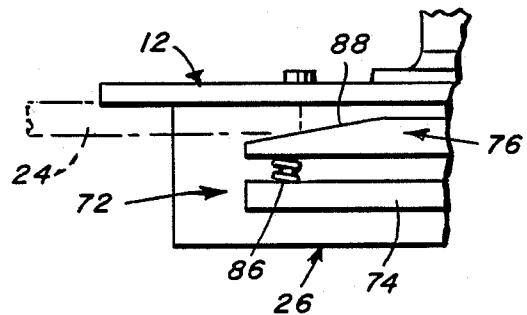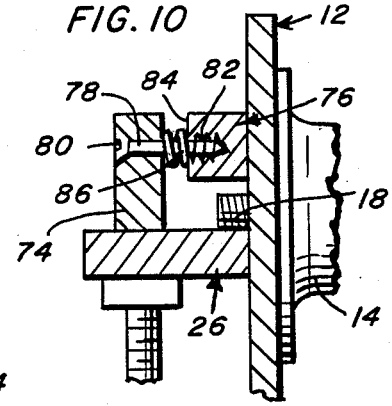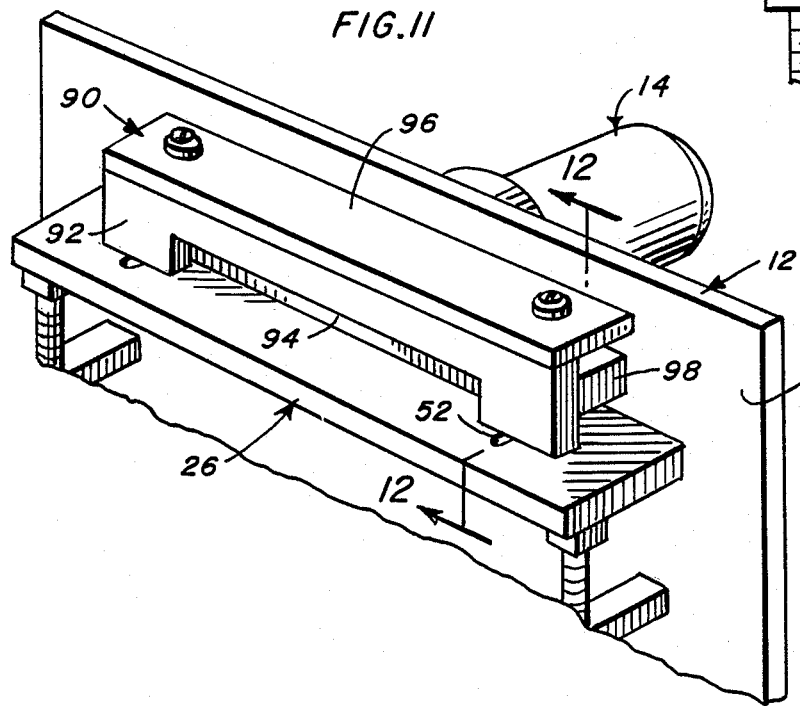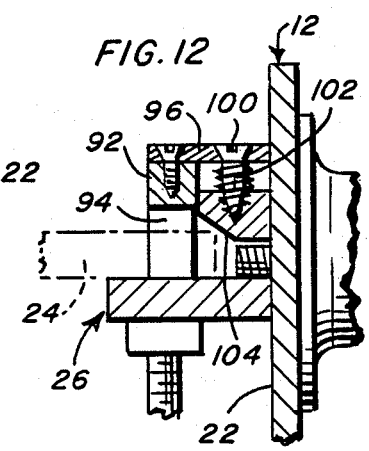

ROUTER STAND WITH GUARD ASSEMBLY

BACKGROUND OF THE INVENTION

The invention herein relates to wood shaping apparatus, in particular apparatus for the defining of edge cuts on, and the shaping of edge portions of, wood workpieces, the edge cuts and/or edge shaping may be for any of a variety of purposes including decorative edging or to provide interlocks such as dovetail or mortise joints, and the like.

Power drive routers, while not normally utilized for edge shaping because of the difficulties in controlling movement of the tool along the restricted width of the workpiece edge, have on occasion been adapted for such work by means of specialized stand structures which horizontally position the router. Examples of such structures will be noted in the following U.S. Pat. Nos.:

4,163,465, Strong, Aug. 7, 1979
4,561,478, Fields, Dec. 31, 1985.

A particular problem with the known systems for edge shaping with a power router is protection of the user against potential hazards arising both from the exposed tool bit and the manner in which the wood is introduced and guided during the cutting operation. Safety has heretofore been largely a function of the skill of the user rather than an inherent feature of the apparatus. This, in turn, has limited the use of the equipment to skilled workmen, and has, even with skilled users, required the exercise of great care.

SUMMARY OF THE INVENTION

The present invention is concerned with a tool stand particularly adapted for use in conjunction with a horizontally oriented power router or like tool which mounts thereon. It is a significant object of the invention that the stand or table specifically incorporate means for accommodating, guiding and stabilizing workpieces as they are guided relative to the operating tool bit, and in combination therewith a guard system which precludes accidental finger or hand engagement with the tool bit regardless of the level of skill of the user.

The tool stand of the invention includes a vertical back support panel which mounts a horizontally positioned router or the like with the cutting bit extending through the panel and rotatable on a horizontal axis. A vertically adjustable horizontal, workpiece-supporting table or base is mounted on the support panel transversely of the projecting bit and generally therebelow. In order to accommodate a full range of vertical adjustment of the table, the table is provided with a bit-accommodating notch or opening therein.

A combination workpiece retainer and finger guard assembly mounted on the workpiece-supporting table or base outward of the cutting bit. This assembly includes an elongate retainer bar or rail paralleling the support panel and mounted on the table for lateral adjustment toward and away from the support panel to accommodate varying width workpieces therebetween.

The workpiece will be introduced to the cutter bit longitudinally into the work area between the retainer rail and support panel from one end thereof. Alternatively, the retainer rail can be provided with an elongate slot allowing for a transverse introduction of the workpiece such as would be desired to accommodate the end edge of a long workpiece as opposed to the longitudinal edge thereof. In each case, the retainer rail mounts a spring-biased finger guard which is spring-retained in overlying relation to the cutter bit preferably engaging directly against the support panel. The spring-loaded nature of the finger guard allows for pivotal movement of the finger guard as the workpiece is introduced into the work area between the retainer rail and support panel with the workpiece, retained by the retainer rail, itself effectively shielding the bit from the user as the guard is shifted to allow entry of the workpiece.

In alternate embodiments the finger guard is in the nature of a presser bar, an elongate bar overlying the cutter bit to prevent direct access thereto and capable of retracting as the workpiece is introduced and immediately extending as the work piece is removed. In this manner, the user is again at all times shielded from the cutter bit.

It is also to be noted that the presser bar performs another significant function in maintaining a constant retaining pressure against the workpiece during the cutting operation while allowing for a degree of maneuverability to accommodate size irregularities and the like.

Other features and advantages of the invention are considered to reside in the details of construction and manner of use as more fully hereinafter described and claimed.

BRIEF DESCRIPTION OF THE DRAWINGS

FIG. 2 is a top plan view of the construction of FIG. 1 illustrating the longitudinal introduction of a work piece to the cutter bit;

FIG. 6 is a partial perspective view of the tool stand illustrating the retainer bar adapted to receive the end portion of a workpiece transversely therethrough;

FIG. 7 is an enlarged cross-sectional detail taken substantially on a plane passing along line 7—7 in FIG. 6;

FIG. 8 is a perspective detail of the tool stand and with a modified retainer bar and guard assembly;

FIG. 9 is a partial plan view of the workpiece-feeding end of the apparatus of FIG. 8;

FIG. 10 is an enlarged cross-sectional detail taken substantially on a plane passing along line 10—10 in FIG. 8;

FIG. 11 is a perspective detail of the tool stand with a further variation of the retainer bar and guard assembly; and FIG. 12 is an enlarged cross-sectional detail taken substantially on a plane passing along line 12—12 in FIG. 11.

DESCRIPTION OF PREFERRED EMBODIMENTS

Figure 1:
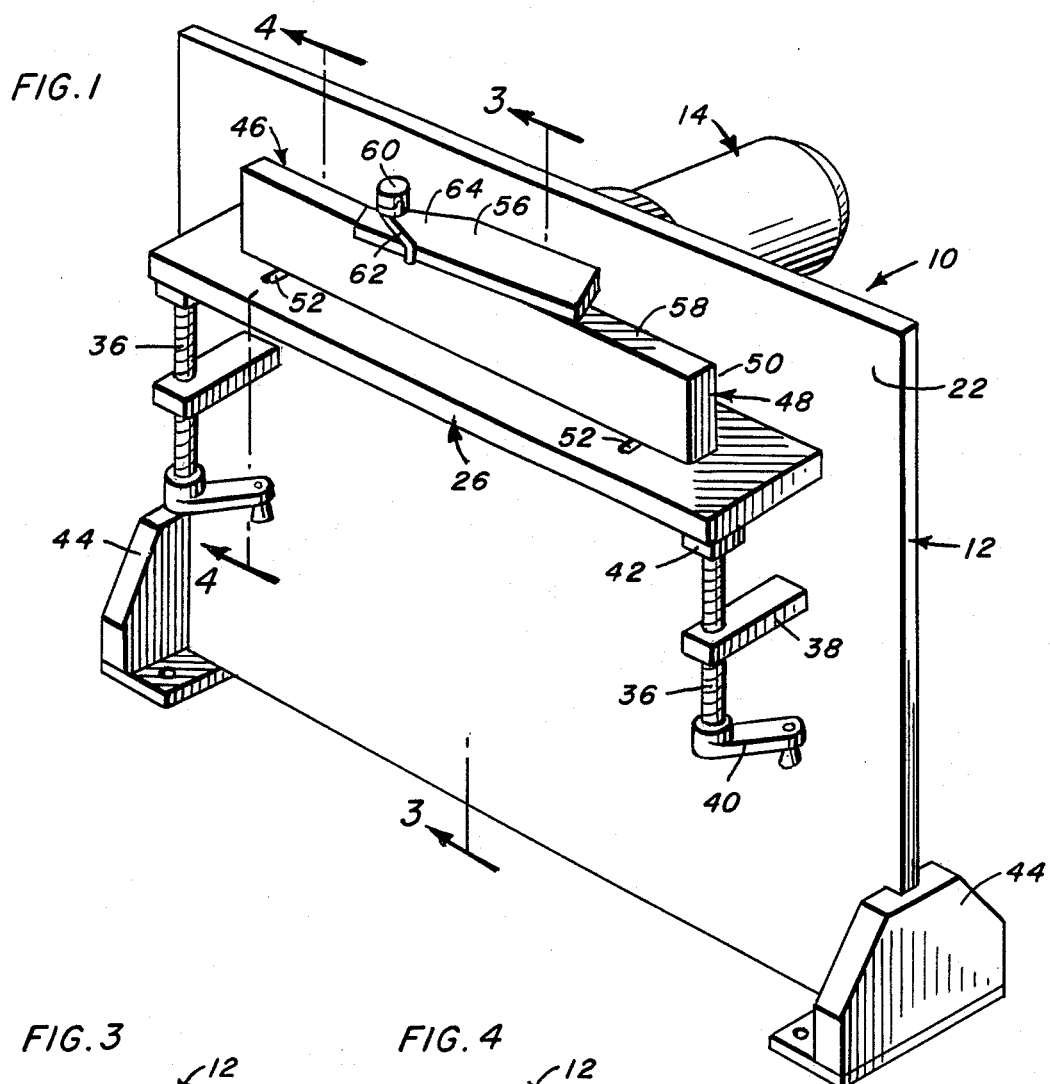
FIG. 1 is a perspective view of the tool stand of the invention with a router mounted in operative position thereon.
Figure 3:
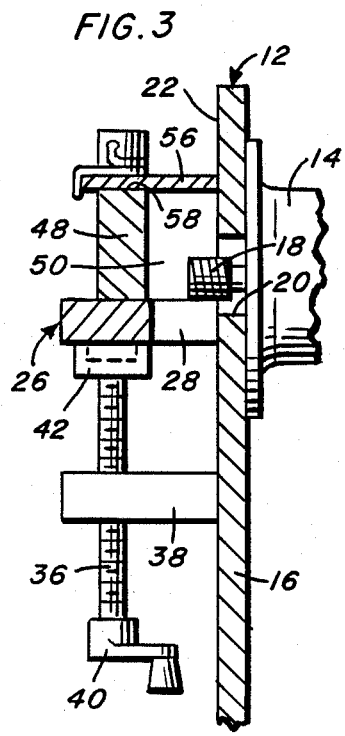
FIG. 3 is an enlarged cross-sectional detail taken substantially on a plane passing along line 3—3 of FIG. 1.
Figure 4:
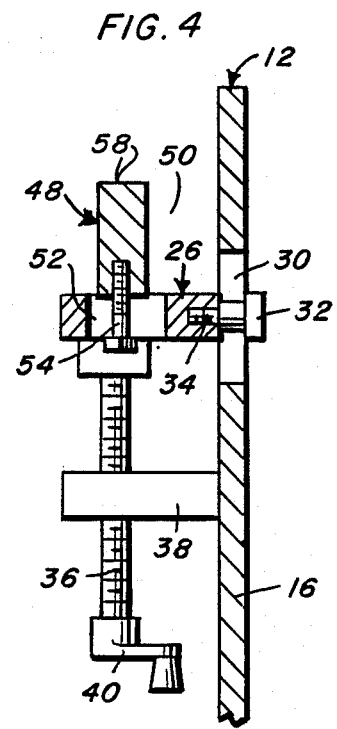
FIG. 4 is an enlarged cross-sectional detail taken substantially on a plane passing along line 4—4 of FIG. 1.
Figure 5:
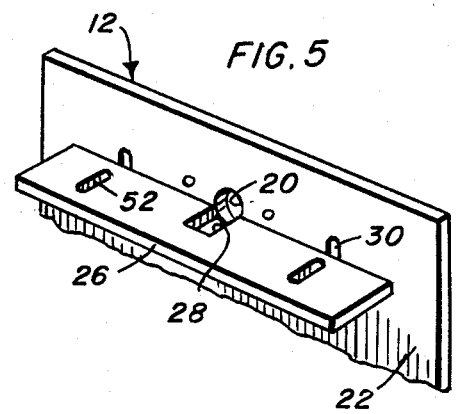
FIG. 5 is a partial perspective detail of the relationship between the vertical support panel and the workpiece-supporting table.

Referring initially to FIG. 1, the tool stand 10 of the present invention basically comprises a rigid vertical support panel 12 which mounts a router or like tool 14 to the rear face 16 thereof with the tool cutter or bit 18 extending through a panel opening 20 and projecting beyond the forward or guide face 22 of the panel for operative engagement with a workpiece 24. The opening 20 is of a size to allow for unencumbered extension and operation of the bit 18 therethrough.

A horizontally oriented workpiece-supporting table 26 is positioned longitudinally along the guide face 22 of the panel 12 in the vicinity of the bit-accommodating opening 20, and is mounted to the support panel for vertical adjustment for a selective varying of the height of the table 26 relative to the bit 18 in accord with the cut desired in the workpiece. Further, in order to accommodate a full range of vertical adjustment of the table 26 relative to the bit 18, the inner edge portion of the table 26 in alignment with the opening 20 is provided with a bit-accommodating notch 28 which allows for an upward adjustment of the table 26 beyond the lower cutting periphery of the bit and to a height approximately equal to the upper cutting periphery of the bit whereby provision is made for a full range of cuts in the workpiece edge from a slight shaving of the workpiece to a full cutting or shaping thereof.

The adjustable mounting of the support table 26 utilizes a pair of vertically elongate slots 30 through the support panel 12, one to each side and outwardly spaced from the bit opening 20. A headed bolt 32 engages through each slot 30 from the rear face 16 of the panel 12 and is threadedly engaged within a mating bore 34 in the rear edge portion of the table 26 whereby, upon a tightening of the two bolts 32, the table is effectively clamped into position against the guide surface 22 of the support panel 12. To adjust the vertical height of the table 26, the bolts 32 are loosened and the table 26 vertically slid along the slots 30 either manually or through appropriate mechanical means such as the two illustrated crank handle shafts 36. The crank handle shafts 36 are merely illustrative of any of several different types of mechanical or power means which can be provided to effect a vertical adjustment of the workpiece-supporting table 26. As illustrated, each crank handle 36 is vertically threaded through a support block 38 fixed to and projecting from the guide face 22 of the support panel 12. The lower end of the shaft 36 includes an operating handle 40 and the upper end of the shaft is rotatable within a block 42 affixed to the user surface of the table 36 whereby upon rotation of each shaft 36, the threaded engagement thereof through the block 38 vertically extends or retracts the shaft 36 with the table 26 adjusting therewith.

The actual range of vertical adjustment of the table 26 is defined by the slots 30 and normally will extend a substantial distance below the bit opening 20.

FIG. 1 illustrates support of the router stand 10 by a pair of opposed flanged base blocks 44 engaged with the opposed lower corners of the support panel 12. Such base blocks can be clamped, bolted or otherwise secured to a work surface. Alternative supporting systems for the router stand are also contemplated, including permanent installation, or provision of a portable enlarged self-supporting base.

The router stand, as thus far described, includes both a highly practical means for horizontally mounted a router or like tool and a workpiece-supporting surface for movement of a workpiece relative to the fixed position tool. However, as described, use of the stand would require a great degree of skill and care both in the manipulation of the workpiece and in avoiding finger or hand contact with the tool bit. The difficulties increase when dealing with small workpieces, particularly wherein edge or end cuts are to be made.

Accordingly, the present invention also provides a guard assembly 46 which mounts on and is carred by the support table 26. The basic guard assembly, as illustrated in FIGS. 1-4, includes an elongate vertical retainer or guide rail 48 positioned longitudinally along the upper support surface of the support table 26 and extending a substantial distance beyond the opposed sides of the router bit notch 28. The retainer rail 48 is in outwardly spaced parallel relation to the guide face 22 of the support panel 12 and defines a work area 50 therebetween. The retainer rail 48 is mounted for lateral adjustment toward and away from the guide surface 22 of the support plate 12 by means of a pair of elongate slots 52 through the table 26, one to each side of the bit notch 28. Each of the slots 52 is transversely elongate and receives a headed bolt 54 upwardly therethrough and into threaded engagement within a threaded bore in the lower edge portion of the retainer rail 48, whereby through a selective threading and unthreading of the bolts 54 the retainer rail 48 can be clamped into position or released for lateral adjustment to vary the width of the work area 50. As will be appreciated, the heads on the bots 54 are of a size to preclude passage through the corresponding slots 52. Depending upon the nature of the workpiece 24 being fed past the cutter or cutting bit 18, the rail 48 can merely function as a guard enclosing the workpiece at the area of the cut, or can effect a positive constant engagement of the workpiece against the bit during the cutting operation.

The assembly 46 also, and significantly, includes a finger guard 56 which comprises a flat panel horizontally overlying the upper edge 58 of the rail 48 generally centrally therealong and vertically aligned with the bit notch 28 in the table 26 and bit opening 30 in the support panel 12. The guard panel 56 is pivotally mounted for selective extension over the work area 50 to overlie the bit 18 and preclude direct finger or hand access thereto, and retraction toward the rail 48 in response to, and to allow for, introduction of the workpiece 24. The pivotal mounting of the panel 56 can be provided by a pivot pin 60 extending through one end portion of the panel 56 and into fixed or locked engagement within the rail 48 through the upper edge 58 thereof. The guard panel 56 will freely rotate on the pivot pin 60. Further, in order to ensure a positive retention of the guard panel 56 in overlying relation to the cutter bit 18 at all times except when physically retracted by the entering workpiece 24, an appropriate spring, for example, a tensioned coil spring 62 as illustrated, will provide a constant force biasing the guard panel 56 toward and into engagement with the guide face 22 of the support panel 12. As noted, the spring 62, in the illustrated embodiment, will include one end fixed within the upper headed end of the pivot pin 60 and the other end engaged against the outer edge of the guard panel 56 forward of the pivot pin. The width of the guard panel 56, as well as the extent of pivotal movement thereof, is such as to engage the support panel 12 and protectively overlie the cutter bit 18 throughout the full range of lateral adjustment of the guard rail 48.

Depending upon the height of the workpiece 24 introduced to the cutter bit within the work area 50, the guard panel 56 will either be continuously engaged with the guide face of the support panel with the workpiece passing therebeneath, or will pivot away from the guide face in response to forward introduction of the workpiece. In the latter situation, the workpiece itself will, during the actual cutting operation, preclude manual contact with the bit, the guard panel 56 automated pivoting into its protective position upon removal of the workpiece.

In order to accommodate larger workpieces which will require pivotal retraction of the guard panel 56, the inner edge of the guard panel adjacent the pivot pin 60 and toward the entry end of the work area 50, the left-hand end in FIG. 1, is bevelled or angled as at 64. This angled portion 64 of the inner edge, at the pivotally mounted end of the guard panel 56, extends beyond the inner face of the rail 48 for unrestricted engagement of the leading end of an inwardly moving workpiece 24 thereagainst, and a responsive outward pivoting of the panel 56.

FIGS. 6 and 7 illustrate a modified guard assembly 66 wherein the guide or retainer rail 68 differs from the rail 48 by the incorporation therein of an elongate slot 70 transversely therethrough and defined upwardly through the lower edge of the rail 68. The slot 70 accommodates the transverse introduction of the end portion of a workpiece therethrough for a tool-shaping of the end of the workpiece. In normal use, the workpiece will be introduced through the feed slot 70 upstream of the bit 18 and into engagement with the guide surface 22 of the support panel 12, after which the workpiece will be moved through the shaping bit. The guard panel 56 will at all times remain extended over the work area in the vicinity of the cutting action to preclude accidental introduction of the hand into the work area before, during or after the shaping operation. It is preferred that the height of the transverse slot 70 be such as to closely accommodate the workpiece and, with the introduced workpiece, effectively enclose the bit against any possibility of accidental engagement therewith.

The rail 68 will normally be adjustably clamped to the table 26 in the same manner as the rail 48, utilizing the transverse elongate slots 52. Should the thickness of the workpiece be greater than the height of the feed slot 70, the effective height of the slot can be increased by the introduction of spacer strips or washers between the lower edge of the guide bar 68 and the upper surface of the support table 26. It will be appreciated that those features of the variation of FIGS. 6 and 7 which duplicate the features of the embodiment of FIG. 1 have been given like reference numerals. It will also be recognized that while the rail 68 includes a feed slot for the transverse introduction of the end portion of a workpiece, the rail can also accommodate the longitudinal introduction of a workpiece in the same manner as previously described with regard to rail 48.

FIGS. 8, 9 and 10 illustrate a further guard assembly embodiment 72 utilizing a solid elongate guide or retainer rail 74 mounted for transverse adjustment on the upper surface of the support table 26 laterally toward and away from the guide face 22 of the support panel in the same manner as the originally described retainer rail 48. The safety guard of the assembly 72 comprises an elongate presser bar 76 positioned parallel to and between the rail 74 and guide surface 22 of the support panel 12 within the work area. The presser bar 76 is of a lesser height than the rail 74 and spaced, throughout the length thereof, above the router bit 18 to define an overlying guard for the bit prior to and during introduction of the workpiece, and after removal of the workpiece.

The presser bar 76 is mounted for lateral movement toward and away from the support panel 12 by a pair of rigid mounting shafts 78 slidably received through the rail 74 for extension beyond the outer face thereof. The shafts 78 each includes an outer head 80 which limits the inward movement of the shafts, and threaded inner ends 82 threadedly engaged within mating threaded bores in the rear face 84 of the presser bar. A coiled compression spring 86 mounts about each shaft between the guide or retainer rail 74 and presser bar 76, the springs functioning to resiliently bias the presser bar to the extended position thereof in engagement with or adjacent to the guide surface of the support panel 12. The extension of the presser bar will be limited by engagement with the support panel 12 or, alternatively, by the enlarged heads 80 on the mounting shafts 78. Any space which might remain between the fully extended presser bar and the support panel is substantially narrow than a user's finger, thus precluding any accidental engagement with the router bit. Also, as noted in FIG. 10, the thickness of the presser bar 76 is greater than the projecting length of the bit 18.

When used in conjunction with a workpiece of a height less than the vertical height between the support table 26 and the presser bar 76, the workpiece is merely fed longitudinally through the work area below the presser bar 76. In those instances wherein the workpiece is of a greater height than the work area space, the introduction of the workpiece, as noted in FIG. 9, is accommodated by a simultaneous retraction of the presser bar 76 through an engagement of the leading end of the workpiece with the bevelled leading portion 88 of the inner face of the presser bar 76. Utilized in this manner, the presser bar 76 will progressively angle away from the guide face 22 of the support panel in conjunction with the inward movement of the workpiece, with the workpiece cooperating with the presser bar 76 to maintain a protective enclosing of the bit throughout the operation.

A further significant feature of the presser bar is its functioning as a means for maintaining a constant pressure on the workpiece throughout the shaping operation to both facilitate handling of the workpiece and avoid any tendency for the workpiece to misorient relative to the bit.

FIGS. 11 and 12 illustrate a further guard assembly variant 90 wherein the guide or retainer rail 92 includes a transverse feed slot 94 therethrough similar to and for the same purpose as the guide slot 70 in rail 68. The rail 92 also includes a full length laterally inwardly extending flange 96 rigid with the upper edge of the rail and extending therefrom into overlying relation to the work area defined between the rail 92 and the guide surface 22 of the support panel 12.

The flange 96 mounts an elongate presser bar 98 horizontally therebelow. The presser bar 98 is vertically adjustable by means of headed shafts 100 engaged through vertical bores in the flange 96. The lower ends of the shafts are threaded into mating bores in the presser bar 98, and coiled compression springs 102 are engaged about each shaft 100 between the overlying flange and the presser bar upper surface for a spring-biasing of the pressure bar to a lower extended position. The presser bar 98, in the extended position thereof, will be of a sufficient height above the support table 26 to accommodate the router bit throughout a range of vertical adjustment of the table 26 for the contemplated range of end cuts.

Both the presser bar 98 and the overlying mounting flange 96 effectively preclude accidental introduction of the hand or fingers to the cutting bit. The presser bar will also tend to reduce the vertical height of the transverse slot 94, thus further reducing the likelihood of accidental engagement of the hand of the user with the cutter bit.

Noting FIG. 12 in particular, in order to facilitate introduction of the workpiece 24 through the transverse slot 94, the outer longitudinal edge portion 104 of the presser bar 98 is bevelled or angled whereby, through an engagement of the leading end of the workpiece 24 therewith, the presser bar 98 will retract upwardly against the biasing force of the springs 102 to allow entry of the workpiece to shaping engagement with the cutting bit 18. The presser bar, in addition to its guard function, will also significantly contribute to the stabilization of the workpiece curing the cutting operation while allowing the user to maintain his hands outside of the work area.

While the presser bar 98 has been shown to be of approximately equal width with the mouting flange 96, either can be of a greater width than the other with the greater width member providing for a full overlying guarding or enclosing of the cutter bit.

As with the rail 68, the effective height of the slot 94 can be varied by the introduction of spacers between the lower support edges of the rail 92, to the opposite ends of the slot 94, and the support table surface immediately therebelow.

The basic router stand described above can be provided as a kit including each of the guard assemblies in that such assemblies are readily interchangeable. In each case, the guide or retainer rail mounts on the work-supporting table for transverse adjustment to vary the width of the work area. The guard, whether in the nature of a pivoted panel or a presser bar, mounts on the rail for adjustment therewith and overlies the work area, at least in that portion thereof wherein the cutter bit is operative. The presser bar, in each form thereof, provides the additional function of stabilizing the workpiece during the shaping operation.

I claim:

1. A tool stand for a power tool with a shaping bit, said tool stand including a vertical panel having a rear face and a forward guide face, means for mounting a power tool immediately rearward of said rear face, an opening defined through said vertical panel between said rear face and said forward guide face for accommodating a tool bit therethrough, a horizontal workpiece-supporting table projecting forwardly from said vertical panel adjacent the tool bit opening, and a workpiece retainer assembly, said retainer assembly comprising a retainer rail on said table laterally spaced from and generally parallel to the guide face of the vertical panel to define a work area therebetween, and a finger guard mounted on said retainer rail and extending between said retainer rail and said guide face in vertically spaced relation above said table.

2. The tool stand of claim 1 including means for effecting a relative vertical adjustment between said table and said vertical panel for varying the position of a table-supported workpiece relative to the tool bit opening.

3. The tool stand of claim 2 wherein said finger guard is adjustable relative to the retainer rail in response to extension of a workpiece into the work area between said retainer rail and the guide face.

4. The tool stand of claim 3 including spring means biasing said finger guard toward a fully extended position in said work area.

5. The tool stand of claim 4 including means mounting said retainer rail on said table for lateral adjustment relative to said guide face to vary the width of the work area.

6. The tool stand of claim 5 wherein said finger guard comprises an elongate guard panel horizontally positioned on said retainer rail, said guard panel having a first end, pivot means on said first end pivotally mounting said guard panel to said retainer rail, said spring means biasing said guard panel about said pivot means and toward said guide face across said work area.

7. The tool stand of claim 6 wherein said guard panel includes an inner edge with a portion thereof adjacent the pivot means extending at an acute angle from the retainer rail and defining an abutment edge against which a workpiece engages upon introduction of the workpiece longitudinally between said guide face and said retainer rail.

8. The tool stand of claim 6 wherein said retainer rail includes an elongate feed slot transversely therethrough for the transverse introduction of a workpiece into said work area.

9. The tool stand of claim 5 wherein said finger guard comprises a presser bar mounted on and generally parallel to said retainer rail within said work area beween said retainer rail and said guide face, said spring means maintaining said presser bar generally parallel to said retainer rail and allowing spring-resisted retraction of said presser bar relative to said guide face for allowing introduction of a workpiece into said work area, and for maintaining spring-biased engagement of the presser bar against an introduced workpiece.

10. The tool stand of claim 9 wherein said presser bar is mounted for horizontal movement and spring-biased toward the guide face of the vertical panel for retention of a workpiece within said work area and against said guide face.

11. The tool stand of claim 9 wherein said presser bar is mounted for vertical movement and spring-biased toward the workpiece-supporting table for retention of a workpiece within said work area and against said table.

12. The tool stand of claim 11 wherein said retainer rail includes flange means rigid therewith and projecting laterally toward said guide face, said presser bar underlying said flange means, said spring means engaging between said flange means and said presser bar.

13. The tool stand of claim 12 wherein said retainer rail includes an elongate feed slot transversely therethrough for the transverse introduction of a workpiece into the work area below the presser bar.

14. The tool stand of claim 1 wherein said finger guard comprises a presser bar mounted on and generally parallel to said retainer rail within said work area between said retainer rail and said guide face, said presser bar being adjustable relative to said retainer rail, spring means biasing said presser bar toward a fully extended position within said work area, said spring means maintaining said presser bar generally parallel to said retainer rail and allowing spring-resisted retraction of said presser bar in response to and for allowing introduction of a workpiece into said work area.

15. The tool stand of claim 14 wherein said presser bar is mounted for horizontal movement and spring-biased toward the guide face of the vertical panel for retention of a workpiece within said work area and against said guide face.

16. The tool stand of claim 14 wherein said presser bar is mounted for vertical movement and spring-biased toward the workpiece-supporting table for retention of a workpiece within said work area and against said table.

17. A tool stand for a power tool with a shaping bit, said tool stand including a vertical panel having a rear and a forward, guide face, means for mounting a power tool immediately rearward of said rear face, an opening defined through said vertical panel between said rear face and said forward guide face for accommodating a tool bit therethrough, a horizontal workpiece-supporting table projecting forwardly from said vertical panel, multiple interchangeable workpiece retainer assemblies, each retainer assembly comprising a retainer rail positionable on the table in laterally spaced generally parallel relation to the guide face of the vertical panel to define a work area therebetween, and a finger guard mounted on said rail for extension between said retainer rail and said guide face, and means for selectively and removably mounting a single one of said retainer assemblies on said table.

18. The tool stand of claim 17 wherein, in each retainer assembly, the finger guard is adjustable relative to the retainer rail, and spring means biasing said finger guard to an extended position relative to the retainer rail for extension into the work area defined by a mounted retainer assembly between the retainer rail and the guide face of the vertical panel.

19. A tool assembly comprising a tool stand and a power router with a router bit, said tool stand including a vertical panel having a rear face and a forward, workpiece guide face, means for horizontally positioning and mounting said power router immediately rearward of said rear face, an opening defined through said vertical panel between said rear face and said forward guide face receiving said router bit therethrough, a horizontal workpiece-supporting table projecting forwardly from said vertical panel, a retainer rail positioned on the table in laterally spaced generally parallel relation to the guide face of the vertical panel forward of said router bit and defining a work area between said rail and said guide face for selectively receiving a workpiece in working engagement with said bit, and a finger guard mounted on said retainer rail and extending across said work area vertically above said bit.

20. The tool assembly of claim 19 including means mounting said finger guard for selective movement between extended and retracted positions relative to said retainer rail, and means spring-biasing said finger guard to the extended position for a spring-resisted retraction of said finger guard upon introduction of a workpiece to said bit within said work area.

* * * * *